Sept. 7, 1926.
C. A. EPPS
TOT BIKE
Filed Feb. 16, 1926
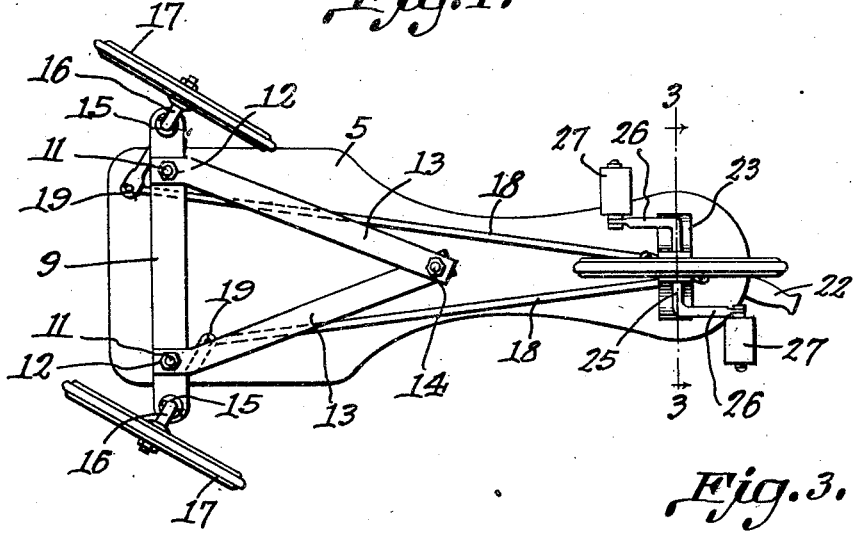
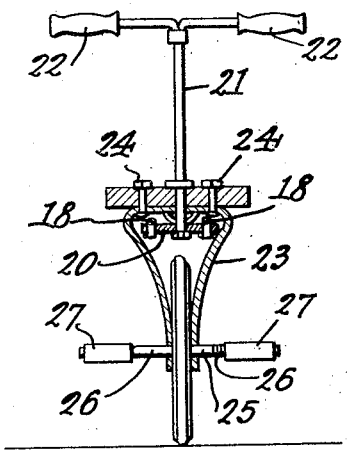
Claude A. Epps, Inventor
By C. A. Snow & Co.
Attorneys Patented Sept. 7, 1926.

1,599,223

UNITED STATES PATENT OFFICE.

CLAUDE A. EPPS, OF PHOENIX, ARIZONA.

TOT BIKE.

Application filed February 16, 1926. Serial No. 88,591.

The present invention relates to a tricycle of a novel construction, especially designed for use by infants or small children.

An important object of the invention is to provide a device of this character so constructed that all possibilities of the device tipping over when making a turn, is eliminated.

Another object of the invention is to provide a device of this character wherein the front or propelling wheel of the tricycle will be held stationary to increase the propelling qualities thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a bottom plan view of a tricycle constructed in accordance with the invention.

Figure 2 is a rear elevational view of the device.

Figure 3 is a sectional view taken on line 3—3 of Figure 1.

Referring to the drawing in detail, the reference character 5 indicates the seat portion of the tricycle which has its side edges cut away adjacent to the forward portion thereof to provide clearances for the legs of the operator.

At the rear of the seat portion are the bars 6 which have their adjacent ends bent upwardly and outwardly as at 7 where they are secured by means of the bolt 8 to the seat portion 5.

Associated with the bars 6 is a transversely disposed bar 9 which is held in spaced relation with the bars 6 by means of the tubular spacing members 10 that have their ends engaging the bars 6 and 9 as clearly shown by Figure 9 of the drawing. Bolts indicated at 11 extend through the bars 6 and 9 and the tubular members 10 to hold the tubular members in position. Nuts 12 are positioned on the lower ends of the bolts to secure the bolts against movement within their openings.

In order that the rear supporting structure will be held against movement, brace bars 13 are provided, which have their rear ends secured by means of the bolts 11. while the forward ends of the bars 13 are secured by a bolt 14 extending through the central portion of the seat 5.

Formed in the bars 6 and bar 9 are aligning openings that act as bearings for the vertical shafts 15 that are formed with latrally extended lower end portions 16 providing axles for the wheels 17, the upper ends of the shafts 15 extending inwardly where they have pivotal connection with the connecting rods 18, as at 19.

The forward ends of the rods 18 extend downwardly and pass through openings disposed adjacent to the ends of the plate 20 which plate 20 is connected with the steering rod 21 that has handle portions 22 formed at its upper end, to the end that as the rod 21 is rotated, the plate 20 will be moved in a horizontal plane to move the connecting rod for moving the shafts 15 and consequently turning the wheels 17 supported thereon to guide the tricycle.

The front or propelling wheel of the device is supported by the substantially inverted U-shaped member 23 which is secured to the forward portion of the seat by means of bolt 24, there being provided openings adjacent to the lower ends of the inverted U-shaped member for the reception of the axle 25 that carries the pedal cranks 26 having pedals 27 on the outer ends thereof.

Thus it will be seen that the wheel by means of which power is delivered to the device is held in a true vertical plane at all times, the steering taking place by movement of the rear wheels as illustrated by Figure 1 of the drawing.

I claim:—

1. A tricycle including a seat portion, bars secured to the rear end of the seat portion and arranged in spaced relation with the seat portion, a bar arranged under the first mentioned bars, said bars having openings, vertical shafts extending through the openings and having right angled end portions, the end portions of each shaft extending in opposite directions, wheels mounted at the lower ends of the shafts, rods having connection with the upper ends of the shafts, means adjacent to the front end of the seat for moving the wheels to steer the tricycle, and a power wheel at the front end of the seat portion.

2. A tricycle including a seat portion, vertical shafts mounted for pivotal movement under the seat portion, said shafts having laterally extended oppositely disposed end portions, wheels mounted on the laterally extended end portions at the lower ends of the shafts, and operating members connected with the opposite right angled ends of the shafts for moving the vertical shafts.

3. A tricycle including a seat portion, vertical shafts mounted for pivotal movement under the seat portion, each of said shafts having an upper and lower end disposed at right angles through the shaft and arranged in opposite directions, wheels mounted on the lower right angle ends, rods connected with the upper right angled ends, and means connected with the rods for moving the rods to operate the shafts to guide the wheels.

In testimony that I claim the foregoing as my own, I have hereto affixed my signature.

CLAUDE A. EPPS.